Patented July 1, 1952

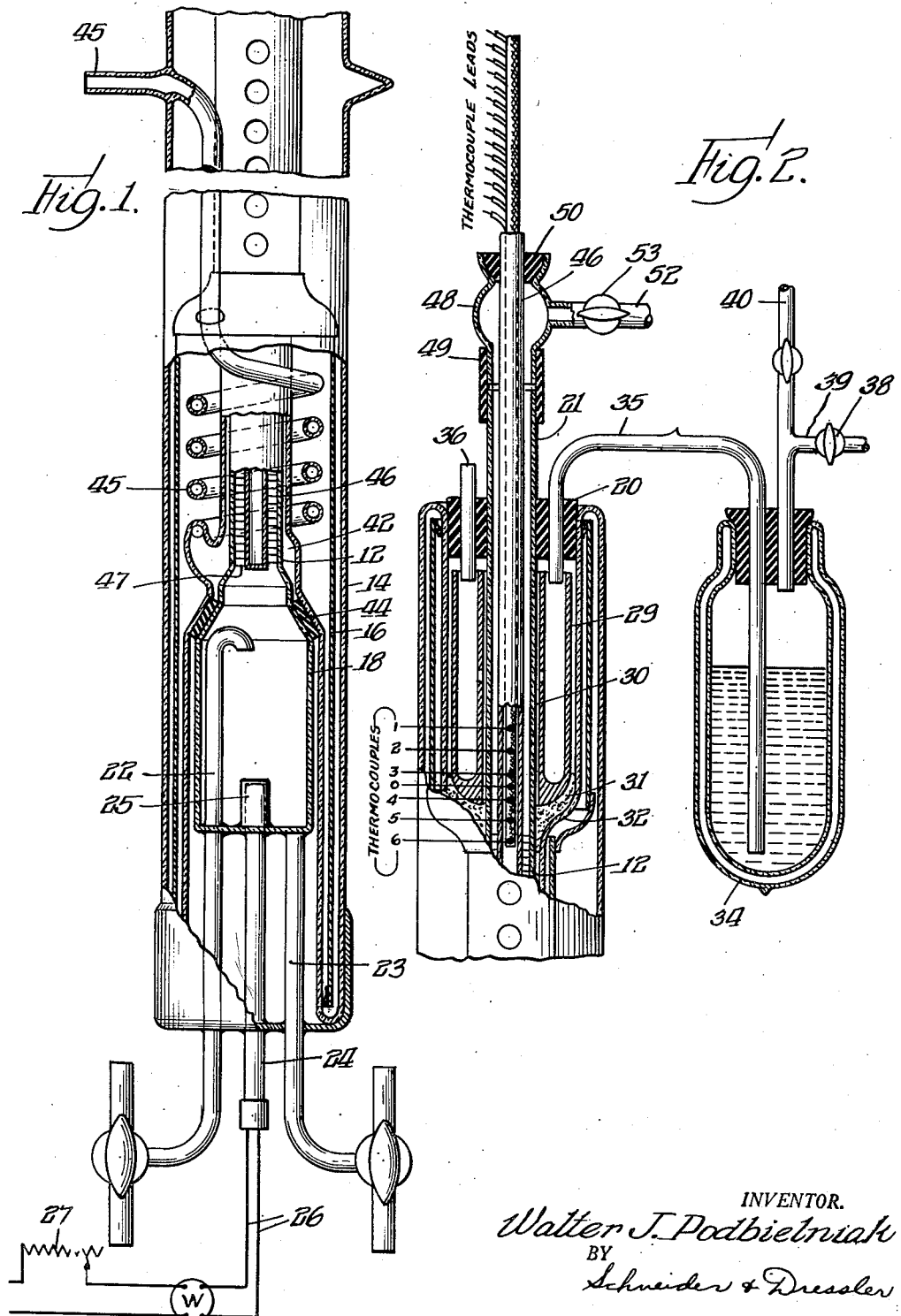

2,602,046

UNITED STATES PATENT OFFICE 2,602,046

MULTIPLE THERMOCOUPLE FRACTIONATING COLUMN

Walter J. Podbielniak, Chicago, Ill., assignor of one-half to Wladzia G. Podbielniak Application June 8, 1945, Serial No. 598,380

6 Claims. (Cl. 202—160)

This invention relates to improvements in the apparatus for the analytical fractionation of volatile liquids and of gases or vapors containing condensible liquid fractions. The fractionating column of this invention is an improvement over those disclosed in my Patents Nos. 1,917,272, granted July 11, 1933; 2,275,648, granted March 10, 1942; and 2,342,366, granted February 22, 1944.

In the fractionating columns of the prior art, particularly the low temperature fractionating columns used to obtain precise fractional distillations for analytical purposes, a single thermocouple is usually positioned in a fixed location in the reflux portion of the column to indicate the condensing temperature of the vaporous products leaving the column. This location is approximately at the region of the uppermost vapor condensation ring in the sample being distilled and, therefore, the thermocouple supposedly indicates the temperature of the vapor leaving the column.

It is very difficult to stabilize the location of this vapor condensation ring. It has been found that this ring tends to wander above and below the usual fixed location single thermocouple, with changing column conditions, over a range of as much as 2 to 3 inches, depending on the sharpness of the break between the constituents of the sample being distilled, the distillation rate, etc. Because of this no single stationary thermocouple can follow all "breaks" accurately, with the result that the liquid boiling temperature readings are not uniformly accurate. While error in temperature recordings due to the wandering of this condensation ring can be minimized by close control of the operating conditions of the column, it cannot be entirely eliminated and it crops up in most analysis results, especially in the case of small percentages of the lowest boiling component, as of propane, for example, in a cracked C4 fraction, etc. Since a low-temperature column may operate on very small samples, a shift or wandering of the condensation ring of as little as about ½ inch may represent a change in the supposedly constant holdup above the thermocouple of about 6 cc. of vapor, or a possible error of about 0.1 to 0.3%, depending on the size and composition of the sample.

Up to the present time the attempts to stabilize the wandering condensation ring to remove this error have not given satisfactory results. In accordance with the present invention I have found a positive solution to this problem in the use of at least three independent thermocouples, spaced at about ⅜ inch intervals in the reflux portion of the column to encompass the maximum usual wandering of the uppermost vapor condensation ring. A conventional, fixed location, independent thermocouple may be used in the fractionating column of my invention, as before, to control the rate of distillation; the other independent thermocouples in accordance with the present invention, however, are used in connection with a temperature recorder, preferably a highly sensitive temperature recorder such as an electronic potentiometer recorder, and with other apparatus, to yield a multiple record of temperature against pressure, thereby obtaining a temperature-pressure distillation curve of the sample undergoing distillation, as described in my above-mentioned patents and in my Patent No. 2,009,814, granted July 30, 1935. This curve (Fig. 4) is in the form of a wide band or ribbon and the upper edge (indicated by the arrow) of the band-like curve is the locus of the lowest reflux temperature, no matter which thermocouple indicates it, and correctly follows the temperature at the uppermost liquid condensation ring.

The fractionating column of my invention will be readily understood from the following detailed description of an illustrative embodiment thereof shown in the drawings in which the conventional fixed location thermocouple to control the rate of distillation is included with the plurality, at least three, of thermocouples which encompass the range of the wandering of the uppermost vapor condensation ring. It is, of course, to be understood that my invention is not to be construed as limited to the details of the illustrative embodiment since these details may be varied without departing from the scope of my invention as defined in the appended claims. Thus, for example, the conventional, fixed location, independent thermocouple may be eliminated as hereinafter described.

Reference is made to the accompanying drawings wherein:

Figure 1 is an enlarged detailed, broken longitudinal section through the lower portion of an illustrative fractionating column, with parts in elevation and broken away to show the column packing;

Fig. 2 is a similar view of the upper portion of the column, showing the thermocouples embodying the novel feature of my invention;

Figures 3, 4:
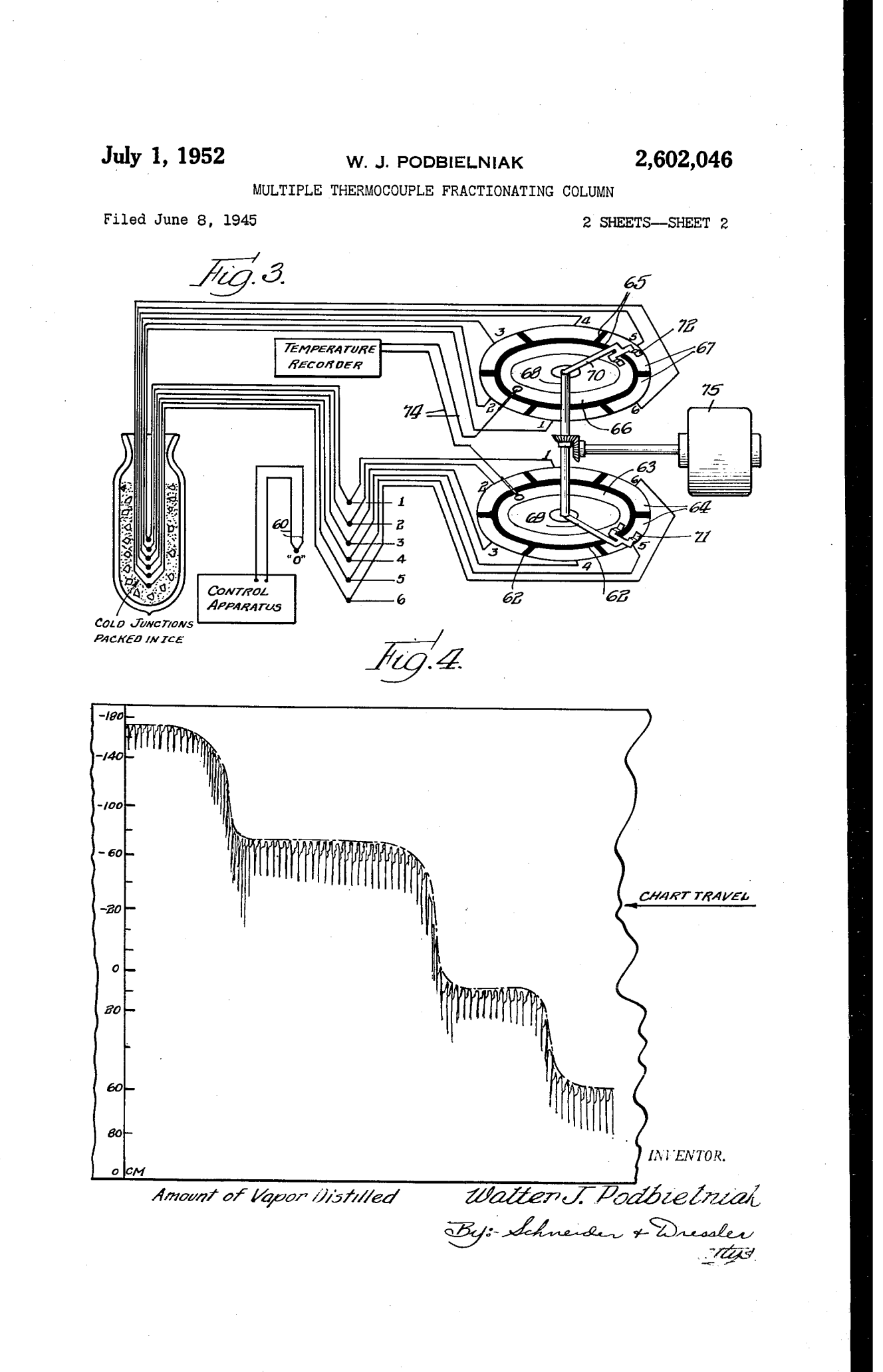

Fig. 3 is a diagrammatic representation of the thermocouples and of a rotating commutating switch for successively connecting the additional thermocouples to a recording device; and Fig. 4 is an illustrative temperature-pressure distillation curve of a sample distilled with the column of the present invention in accordance with the procedures described in my above-mentioned patents; the exact sequence and location of the recorded individual temperatures not being precisely drawn.

Referring more particularly to the drawings, there is shown a fractionating column which, except for the additional, independent thermocouples embodying my invention and the packing, is substantially similar to the column shown in my Patent No. 2,275,648. While the present invention is illustrated in connection with a preferred fractionating column, it is not limited thereto since the additional thermocouples may be incorporated in any analytical fractionating column, in the columns of my prior patents above referred to, for example.

The fractionating column structure illustrated comprises a distilling tube 12 surrounded by an evacuated jacket member 14, both formed of a low expansion heat-resistant glass such as "Pyrex," or other suitable material, and a metallic reflector member 16 which is mounted between the spaced walls of the jacket member and which extends substantially throughout the length thereof. The lower end of the distilling tube is enlarged to form a distilling bulb 18 and the upper end of the tube extends through a stopper 20 of rubber or rubber-like material, which plugs the opening at the top of the column, and out through the column as at 21. A sample inlet tube 22 of glass or other suitable material extends into the bulb 18, and a tube 23 of similar material serves to establish communication between the bulb and a mercury bottle (not shown) and between the bulb and a graduated receiver (not shown), as fully described in my Patent No. 2,342,366.

Heat may be supplied to the sample in the bulb by means of a metal-clad, cartridge-type electric resistance heater 24 which extends into an "off-centered" glass heater well 25 formed in the bottom of the bulb. The current supply wires 26 of the heating element lead to a conventional rheostat 27 which may be controlled to regulate accurately the heat input. Obviously, any other suitable heating means may be employed for this purpose.

In the upper portion of the column, immediately beneath stopper 20, a double-walled annular metallic vessel 29 surrounds tube 12 and is spaced therefrom as at 30. The vessel is supported in the position shown by a suitable insulating material such as glass wool 31 which surrounds the tube and rests on a shoulder 32 formed in the inner wall of vacuum jacket 14. Liquid air is introduced into vessel 29 from a thermos bottle 34 through a vacuum-jacketed, silvered tube 35 which extends through stopper 20 and into the mouth of the vessel. The liquid air serves to cool the vessel and, in turn, tube 12 to condense vapors therein and provide reflux. The liquid air vaporized in the vessel is vented through a tube 36 which extends from the vessel through the stopper. The supply of liquid air to the vessel may be manually controlled, as by a hand-operated valve 38 in a compressed air supply line 39 leading to a suitable compresser; or it may be controlled automatically as described in my Patent No. 2,275,648. A valve-controlled vent tube 40 is provided to vent the compressed air from thermos bottle 34 to the surrounding space.

In the operation of the fractionating column shown herein, the vaporized liquid air circulates in the vessel 29 and then escapes through vent 36. In the event it is desired to circulate liquid air vapors throughout the length of the tube during operation in accordance with the present invention, vent 36 may be plugged or even dispensed with and an opening provided in the wall of vessel 29 adjacent the tube to establish communication between the vessel and space 30. The vaporized liquid air will then flow through space 42 between tube 12 and the inner wall of vacuum jacket 14 to the bottom thereof, formed by plug or gasket 44, and then out through vent tube 45.

So much of the fractionating column described above is substantially similar to the fractionating column shown and described in my Patent No. 2,275,648.

The effective length of the distilling tube which may be used in accordance with the present invention may be in the order of about 48″ to about 60″ and its internal diameter in the order of about preferably, 6.3 mm. to 8 mm., for low boiling point samples which are usually distilled in low-temperature fractionating columns. For samples which are normally liquids at room temperature, considerably larger tubes may be employed, for example, tubes having an internal diameter even up to about 1″, or more if found desirable. The relatively large diameter tubes in accordance with the present invention, either for low boiling point or high boiling point samples, are necessary in order to accommodate a tube core 46 having a packing 47 wrapped around it.

Tube core 46, of stainless steel or other corrosion resistant alloy, is suspended from a hollow globular-shaped glass member 48 which may be removably joined in an air-tight fit to portion 21 of tube 12 by a suitable rubber connection 49. The tube core extends axially through member 48 and is secured and sealed thereto, as by a cement joint or plug 50 which attaches the tube core adjacent its open end to the walls of member 48. As shown in the drawings, tube core 46 extends throughout the length of tube 12 and its closed lower end terminates approximately at the juncture between the tube and distilling bulb 18.

Tube core 46 may have, for example, an outside diameter in the order of about 6 to 8 mm. and the wall thereof a thickness, for example, in the order of about 0.005 inch to 0.010 inch. Before inserting tube core 46 into tube 12, the packing 47 is wound about the tube core and the composite structure so formed is inserted into the tube. The method of making this packing is described in my Patent No. 2,332,110, granted October 19, 1943. As is manifest from the drawing, packing 47 extends between a point slightly below the cooling vessel 29 and the top of distilling bulb 18, but it may extend upwardly in the tube to any desired extent.

Packing 47 may be, suitably, in the form of a coil or coils of small wires, or of a closely spaced wired structure, as in my Patent No. 2,275,648, or it may have any other suitable form. I prefer, however, that the packing be in the form described and claimed in my Patent No. 2,332,110, and particularly as shown in Fig. 23 of that patent. The preferred form of packing in accordance with my invention may be wound about the tube core and inserted in the tube and then treated to form the packing, all as described in my Patent No. 2,332,110. The packing serves to bring about a more extended and intimate surface contact of the downwardly flowing reflux liquid with the vapors rising from the distilling bulb. The packing of my Patent No. 2,332,110 is preferred because it appears to be the most effective packing for bringing about this extended and intimate contact of liquid and vapors.

Under normal conditions of distillation, the vapors rising out of the distillation tube are permitted to pass continuously through the hollow portion of member 48 surrounding the tube, then to a line 52 for disposition or collection, as desired. For example, line 52 may be connected to a manifold and, in turn, to an automatic distillation control apparatus as described in my Patents Nos. 1,967,258 and 2,275,648. A manually operated valve 53 in line 52 is provided to enable the operator to close in the column so that it operates under total reflux and establishes equilibrium conditions within the column. This is a desirable procedure to follow before initiating distillation.

The condensing temperature of the vaporous product leaving the column during distillation has been indicated and the rate of distillation controlled in the past, as in my above-mentioned patents, by a thermocouple located in the reflux portion of the column at the approximate position of the uppermost portion of the liquid condensation ring. A similar thermocouple within tube core 46, with its junction "O" in the same approximated position, may be used in the column of my invention, but only, however, to control the rate of distillation. The condensing temperature of the vaporous product is indicated and determined by means of additional independent thermocouples, spaced at about ⅜ inch intervals, preferably above and below thermocouple "O", to encompass the maximum usual wandering of the vapor condensation ring. In the drawings there are shown six such additional thermocouples, the junctions thereof being numbered 1, 2, 3, 4, 5 and 6. It is to be understood that the number of such additional thermocouples may be increased or decreased, as desired, but there must be a minimum of three thermocouples. The conventional, fixed location thermocouple junction "O" is preferably located in the approximate center of the usual range of travel of the wandering vapor condensation ring, and in the drawings it is located between the additional, independent thermocouple junctions 3 and 4; however, it may be otherwise positioned in the region of the wandering condensation ring.

Each of the thermocouple junctions "O", 1, 2, 3, 4, 5 and 6 are of the conventional single-junction type and consist of a copper wire and a constantan wire for low-temperature operations, and of other suitable metals for high-temperature operations. The free ends or leads of the thermocouples extend outwardly from the tube core and are connected to the terminals of recording potentiometers. The thermocouple leads 60 (Fig. 3) from junction "O" are connected in the conventional manner to a distillation control apparatus, as in my Patent No. 2,275,648, for example, and the rate of distillation may be controlled by this thermocouple as described in this patent, for example. The thermocouple leads from the additional thermocouples are connected to an independent potentiometer recorder, preferably a very sensitive instrument such as an electronic potentiometer recorder, through a rotating commutating switch, which serves to record, successively, the temperature at the thermocouple junctions, from 6 to 1, in the illustrative embodiment shown.

The commutating switch is diagrammatically illustrated in Fig. 3 of the drawings. It is constructed and operated to establish an electrical connection of the hot and cold junctions of each of the thermocouples, in succession, with the potentiometer recorder, thereby successively impressing across the potentiometer of the recorder the voltage developed by the thermocouples and recording the corresponding temperatures.

As illustrated, the commutating switch comprises a pair of supporting plates of suitable insulating material. Supporting plate 62 carries continuous annular contact member 63 of conducting material such as copper or brass and in a concentric ring, a series of segments 64, one such segment being provided for each of the thermocouples 1 to 6. One lead from each of the thermocouple junctions within the column is connected to each of the segments. The other leads are connected to the corresponding cold junctions (packed in ice) in the usual manner.

The second supporting plate 65 likewise carries a continuous annular contact plate 66 and a concentric ring made up of the separated segments 67, which likewise correspond in number to the number of thermocouples and each of which is connected electrically to its corresponding cold junction.

A rotating shaft 68 is mounted with its axis joining the centers of the concentric contact members on each of the supporting plates 62 and 65, and this shaft carries two arms 69 and 70, which support respectively the brushes 71 and 72, which bridge the contact members on the respective plates and make an electrical connection between them. The arms 69 and 70 on the rotating shaft 68 are so positioned with respect to each other that the segmental contact members 64 and 67 on the two supporting plates, corresponding to a particular thermocouple and its cold junction, are simultaneously contacted.

The solid annular contact members 63 and 66 are connected to the terminals of the temperature recorder through leads 74. Thus it will be apparent that at regular intervals in the rotation of the shaft 68, a complete electrical connection will be made between each thermocouple, its corresponding cold junction and the temperature recorder so that the voltage developed by the thermocouple will be impressed across the potentiometer or other device employed in the temperature recorder and thereby cause the corresponding temperature to be recorded.

In the position illustrated in Fig. 3, the commutating switch is shown in position for recording the temperature of thermocouple No. 5. One lead of the No. 5 thermocouple in the column is connected to the segmental contact 64 bearing the number 5 on the supporting plate 62 of the switch. The brush 71 makes an electrical connection between this segmental contact plate and the solid annular contact plate on the same supporting plate, which is in turn connected to the temperature recorder. The other lead from the No. 5 thermocouple in the column passes to the corresponding cold junction and from it a connection is made to the segmental plate 67, also bearing the number 5, mounted on the other supporting plate 65. The brush 72 on the other supporting arm 70 makes a connection between segmental contact plate 67 and the solid annular contact plate 66 on the same supporting plate, and from the latter contact plate a connection is made to the other terminal of the temperature recorder.

The rotating shaft 68 and the arms 69 and 70 carried by it are rotated by a motor 75, preferably of the constant speed type, through suitable gearing, at a slow rate, say 1 to 2 R. P. M., the connection between each thermocouple and the recorder thus being made for a sufficient length of time to permit the recorder to properly record the temperature corresponding to each individual thermocouple in the column. As the shaft 68 of the commutating switch rotates, the temperature of each of the couples is successively recorded by the recording instrument, developing a curve from which the minimum temperature within the zone encompassed by the thermocouples is clearly indicated.

In Fig. 4 there is shown a typical distillation curve of a cracked $C_4$ sample run at about 300 mm. absolute pressure, as obtained with the fractionating column of my invention operated in accordance with the teachings of my application Serial No. 598,379, filed on even date herewith, and my Patent No. 2,275,648. This curve is a continuous record of the E. M. F. of the six copper-constantan thermocouples, each recorded consecutively for a ten second interval, for example, against the pressure rise in the distillate receivers (not shown), as described in my Patent No. 2,275,648. The locus of the lowest temperatures recorded during each cycle (which is one minute for the six thermocouples in the illustrative case) against the pressure rise in the distillate receiver may be considered to be the correct distillation curve. This is the envelope on the left side of the curve, as viewed in the drawing with the arrow pointing to the right. The distance between the left hand envelope and right hand envelope of the curve, measured perpendicularly to the direction of chart travel on the recording device, is approximately the "spread" of the thermocouples or the difference between the lowest and highest temperature recorded during one complete cycle of the switch.

In the hereinabove described illustrative embodiment of my invention, a fixed location, independent thermocouple is used to control the rate of distillation. The use of this fixed location thermocouple is not essential, however. If there is no automatic control of the distillation rate by a thermocouple the column may be operated at a fixed rate, or a variable rate dependent on the judgment of the operator.

In a low temperature fractionating column the vapors above the uppermost vapor condensation ring almost immediately superheat from thermal conduction from room temperature and, therefore, the uppermost vapor condensation ring is the lowest temperature in the column reflux zone. The same situation may exist in many designs of high temperature fractionating columns where the product boiling point is above room temperature, but portions of the column reflux above the normal uppermost vapor condensation ring are higher than the product boiling point, thus leading to superheating of vapor above the uppermost vapor condensation ring. In consequence, by providing three or more independent thermocouples in the region of the condensing temperature of the vapors leaving the column and encompassing the range of the wandering of the uppermost vapor condensation ring, I am enabled to obtain a more nearly accurate record of the temperature of the uppermost vapor condensation ring by taking the readings of the lowest temperature thermocouple, whichever it may be, than by following the readings of any one fixed location thermocouple or a group of fixed location thermocouples arranged in parallel.

I claim:

1. In apparatus for precise fractionation, a fractionating column having a reflux condensing zone including a varying minimum temperature point of vapor condensation, at least three spaced independent thermocouples within said reflux condensing zone in the region of said minimum temperature point and means for successively and cyclicly recording the temperatures indicated by said thermocouples to thereby determine and record the minimum temperature within said reflux condensing zone.

2. In apparatus for precise fractionation, a fractionating column having a reflux condensing zone including a varying minimum temperature point of vapor condensation, a thermocouple within said zone, means operable from said thermocouple for controlling the rate of distillation within said column, a plurality of spaced independent thermocouples within said reflux condensing zone in the region of said minimum temperature point, and means for successively and cyclicly recording the temperatures indicated by said independent thermocouples to thereby determine and record the minimum temperature within said refluxing condensing zone.

3. In precise fractionation apparatus, a fractionating column, means for applying cooling adjacent the top of said column to form a reflux condensing zone including a varying minimum temperature point of vapor condensation, a thermocouple within said zone in the region of said minimum temperature point, means operable from said thermocouple to control the cooling means, thereby controlling the rate of distillation from said column, a plurality of independent spaced thermocouples within the reflux condensing zone in proximity to said control thermocouple and positioned above and below it, and means for successively and cyclicly recording the temperatures indicated by said independent thermocouples to thereby determine the minimum temperature within said reflux condensing zone in proximity to said control thermocouple.

4. In apparatus for determining and recording conditions in analytical distillation apparatus having a fractionating column supplied with vapors at its lower end and cooled at its upper end, with vapor exit means at its upper end, said column having near its upper end a minimum temperature point of vapor condensation susceptible of variation within a limited region, a plurality of spaced independent thermocouples within the region of variation of said minimum temperature point and means for successively and cyclically recording the temperatures indicated by said thermocouples to thereby ascertain and record the minimum temperature within said region.

5. In apparatus for determining and recording conditions in analytical distillation apparatus having a fractionating column supplied with vapors at its lower end and cooled at its upper end, with vapor exit means at its upper end, said column having near its upper end a minimum temperature point of vapor condensation susceptible of variation within a limited region, a thermocouple in said region of variation of the minimum temperature point, means operable from said thermocouple for controlling the rate of distillation from said column, a plurality of independent spaced thermocouples within said region of variation of the minimum temperature point including thermocouples positioned above and below the said control thermocouple, and means for successively and cyclically recording the temperatures indicated by said independent thermocouples to thereby ascertain and record the minimum temperature within said region.

6. In apparatus for determining and recording conditions in analytical distillation apparatus having a fractionating column supplied with vapors at its lower end and cooled at its upper end, with vapor exit means at its upper end, said column having near its upper end a minimum temperature point of vapor condensation susceptible of variation within a limited region, a thermocouple in said region of variation of the minimum temperature point, means operable from said thermocouple for controlling the rate of distillation from said column, a plurality of independent spaced thermocouples within said region of variation of the minimum temperature point including thermocouples positioned above and below the said control thermocouple, recording means comprising a continuous traveling record receiving sheet and a single recording device for producing a temperature record thereupon, and means for successively and cyclically operating said recording device from said independent spaced thermocouples whereby a single continuous temperature record is made therefrom of the temperature band encompassed by said thermocouples, one margin of said band indicating the minimum temperatures within said zone.

WALTER J. PODBIELNIAK.

REFERENCES CITED

The following references are of record in the file of this patent:

UNITED STATES PATENTS

| Number | Name | Date |
|---|---|---|
| 1,917,272 | Podbielniak | July 11, 1933 |
| 2,069,490 | Fenske | Feb. 2, 1937 |
| 2,088,385 | Podbielniak | July 27, 1937 |
| 2,346,443 | McMillan | Apr. 11, 1944 |

OTHER REFERENCES

McMillan: "Analytical Fractionation of Hydrocarbon Gases," Journal of Institution of Petroleum Technologists, vol. 22, 1936, pages 640, 641.

Industrial and Engineering Chemistry, Analytical Edition, vol. 8, pages 478 to 480.